Sept. 1, 1964  W. A. ANDERSON  3,147,428
GYROMAGNETIC RESONANCE APPARATUS
Filed Oct. 16, 1958  4 Sheets-Sheet 1

INVENTOR.
Weston A. Anderson
BY Paul B. Hunter
Attorney

Sept. 1, 1964     W. A. ANDERSON     3,147,428
GYROMAGNETIC RESONANCE APPARATUS
Filed Oct. 16, 1958     4 Sheets-Sheet 2

INVENTOR.
Weston A. Anderson
BY
Paul B. Hunter
Attorney

INVENTOR.
Weston A. Anderson
BY Paul B. Hunter
Attorney

Sept. 1, 1964 W. A. ANDERSON 3,147,428
GYROMAGNETIC RESONANCE APPARATUS
Filed Oct. 16, 1958 4 Sheets-Sheet 4

INVENTOR.
Weston A. Anderson
BY Paul B. Hunter
Attorney

United States Patent Office 3,147,428
Patented Sept. 1, 1964

3,147,428
GYROMAGNETIC RESONANCE APPARATUS
Weston A. Anderson, Palo Alto, Calif., assignor to Varian Associates, Palo Alto, Calif., a corporation of California
Filed Oct. 16, 1958, Ser. No. 767,654
18 Claims. (Cl. 324—.5)

This invention relates in general to gyromagnetic resonance apparatus and more particularly to novel improved apparatus and methods utilizing side band resonance techniques for producing and detecting gyromagnetic resonance.

The present invention involves utilization of modulation techniques in a gyromagnetic resonance system in which the parameters of the system are so arranged that side band resonances are produced and, by suitable receiver circuitry, one of these side band resonance signals is observed. The present invention encompasses the use of polarizing magnetic field modulating systems for producing the desired side band resonances and, in addition, an embodiment in which the driving radio frequency signal utilized to produce the gyromagnetic resonance is frequency modulated and utilized with an amplitude modulation receiving end. In an another embodiment, the radio frequency transmitter signal is amplitude modulated by suitable means while the receiver section of the system utilizes frequency modulation for detection of the side band resonance signal.

It is, therefore, the object of the present invention to provide novel improved gyromagnetic resonance systems utilizing side band resonance techniques.

One feature of the present invention is the provision of a novel side band resonance gyromagnetic resonance system in which the side band resonance is produced by modulation of the unidirectional polarizing magnetic field, the receiver section of the system being responsive to the side band resonance signal obtained from the sample.

Another feature of the present invention is the provision of a novel gyromagnetic resonance system wherein side band resonances are produced in the gyromagnetic resonance sample by a frequency modulation of the radio frequency transmitter signal, the receiver section being sensitive to amplitude modulation of the resonance signal.

Still another feature of the present invention is the provision of a side band resonance gyromagnetic resonance system wherein the driving radio frequency transmitter signal is amplitude modulated to produce side band resonances, the receiver section of the system being made sensitive to frequency modulation.

Still another feature of the present invention is the provision of a novel gyromagnetic resonance system utilizing the modulation technique in a high resolution type spectrometer to reduce or eliminate base line drift of the signal, this system utilizing balanced modulator techniques for accomplishing the desired result.

These and other features and advantages of the present invention will become more apparent after a perusal of the following specification taken in connection with the accompanying drawings wherein.

Figures 1, 2, 3:
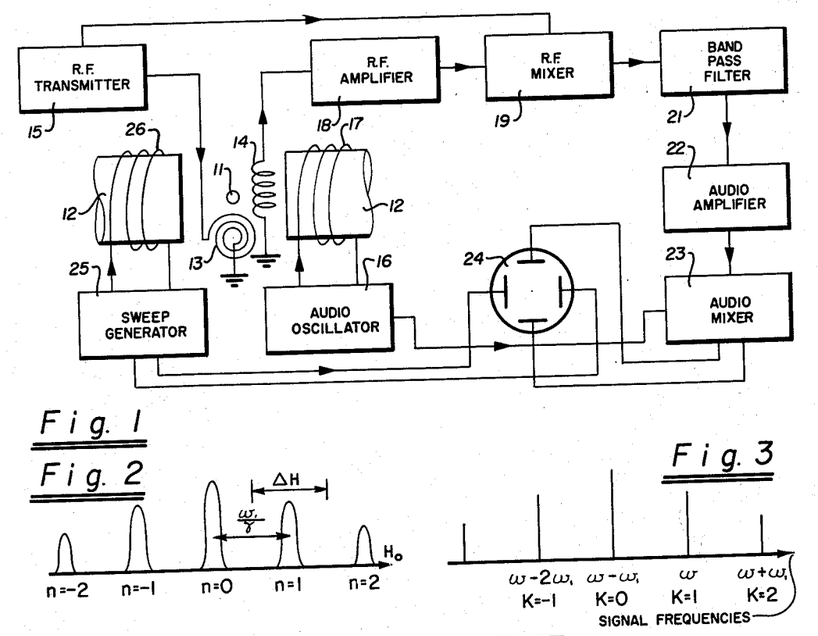
FIG. 1 is a block diagram showing a side band resonance gyromagnetic resonance system in which audio modulation of the magnetic field is utilized to produce the side band resonance, the system being a crossed-coil type of resonance system.
FIG. 2 is a graphical illustration of the resonance signals obtained from a system of the type shown in FIG. 1.
FIG. 3 is a graphical illustration showing the frequency components of one of the side band resonance signals of the type shown in FIG. 2.

Referring now to FIG. 1 there is shown in block diagram form a crossed-coils gyromagnetic resonance spectroscopy system embodying the present invention. The chemical sample 11 to be analyzed by means of gyromagnetic resonance, for example, resonance of the nuclear magnetic moments of the sample, is placed in the strong unidirectional magnetic field $H_0$ in the gap of a permanent magnet or electromagnet 12. A transmitter coil 13 and a receiver coil 14 are located in close coupling relationship to the sample 11, the coils being mutually perpendicular and also perpendicular to the unidirectional magnetic field $H_0$. A radio-frequency transmitter 15 is coupled to the transmitter coil 13 and supplies a radio-frequency driving field $H_1$ to the sample 11 at an angular frequency $\omega$, for example, 60 megacycles in field $H_0$ of approximately 14,100 gauss for protons, to produce the desired nuclear magnetic resonance in the sample in a manner well known in the art, side band resonance being produced in a manner described below.

Due to the close physical proximity of the receiver coil and the transmitter coil, there is a small electro-magnetic coupling therebetween despite the fact that these two coils are positioned normal to each other, and because of this slight coupling the receiver coil has induced therein a small leakage signal from the transmitter coil at the transmitter frequency $\omega$. At or near resonance of the nuclear magnetic moments in the sample the receiver coil also has induced therein a signal due to the resonance condition of the nuclei at the frequency $\omega$.

The unidirectional magnetic field $H_0$ is modulated by an audio frequency magnetic field $H_m$ from the audio oscillator 16 and associated modulation coil 17 at an audio-frequency $\omega_1$ for example, 2 kc., the amplitude of the unidirectional magnetic field thus being modulated at the audio-frequency rate to give a total field $H_Z = H_o + H_m \cos(\omega_1 t + \phi)$.

To determine the effects of field modulation consider a special solution of the phenomenological equations in the Physical Review article, vol. 70, pages 460–74, 1946 by Felix Bloch. If we let $m = M_x + iM_y$, $h = \gamma(H_x + iH_y)$ and $\omega_A = \gamma H_Z$ the equations may be written in the following form $$(1) \quad \frac{dm}{dt} + i\omega_A m - iM_Z + \frac{m}{T_2} = 0$$

$$(2) \quad \frac{dM_Z}{dt} + I_m(mh^*) + \frac{M_Z}{T_1} = \frac{M_o}{T_1}$$

where $I_m$ denotes the imaginary component and $*$ denotes the complex conjugate.

The oscillation radio-frequency field along the $x$-axis may be decomposed into two counter-rotating fields. Since only the rotating field which rotates in the same direction as the Larmor precession is effective in stimulating transitions, see the Bloch-Siegert paper, Physical Review, vol. 57, 1940, page 522, only this component need to be used in the analysis. If the applied R.F. field is sufficiently small, one may replace $M_Z$ by $M_o$ and neglect Equation 2. With $m = m_1 e^{-i\omega t}$ and $h = h_1 e^{-i\omega t}$ Equation 1 becomes $$(3) \quad \frac{dm_1}{dt} + i(\omega_A - \omega)m_1 + \frac{m_1}{T_2} = ih_1 M_o$$

The field modulation has the form $$H_Z = H_o + H_m \cos \omega_1 t$$

which is equivalent to $\omega_A = \omega_o + \gamma H_m \cos \omega_1 t$ where $\omega_o = \gamma H_o$ and let $\Delta\omega = \omega_o - \omega$.

With the above substitutions the differential Equation 3 has the solution $$m_1 = ih_1 M_o \int_{-\infty}^{t} \exp \int_{t}^{t'} \left\{ \frac{1}{T_2} + i\Delta\omega + i\gamma H_m \cos \omega_1 t'' \right\} dt'' dt'$$

If the variation of $\Delta\omega$ is sufficiently slow, one obtains $$(4) \quad m_1 = ih_1 M_o \int_{-\infty}^{t} \left[ \exp \left\{ \left( \frac{1}{T_2} - i\Delta\omega \right)(t' - t) + i\beta \sin \omega_1 t' - i\beta \sin \omega_1 t \right\} \right] dt$$

with $$\beta = \frac{\gamma H_m}{\omega_1}$$

This equation may in integrated with the help of the identity $$\exp\{i\beta \sin \omega_1 t\} = \sum_{n=-\infty}^{\infty} J_n(\beta) \exp(in\omega_1 t)$$

where $J_n(\beta)$ are Bessel functions of the first kind. Upon integrating one obtains $$(5) \quad m_1 = ih_1 T_2 M_o \sum_{k=-\infty}^{\infty} \sum_{n=-\infty}^{\infty} \frac{J_k(\beta) J_n(\beta) \exp\{-i(k-n)\omega_1 t\}}{1 + i(\Delta\omega + n\omega_1) T_2}$$

The quantity $m_1$ is just the magnetization in the rotating coordinate system and thus it is a measure of the signal $u + iv$ which one obtains after mixing the signal voltage with the R.F. reference voltage. This analysis shows that the resonance condition is not only fulfilled by the equation $\omega = \gamma H_o$ but also a series of additional side band resonances are obtained, each resonance separated from the adjacent resonance by $\omega_1/\gamma$ in magnetic field units. These resonances are indicated diagrammatically in FIG. 2. Here each separate resonance corresponds to a different value of $n$ in Equation 5. If we now select a given resonance signal, $n$, and Fourier analyze the frequencies present in the signal, we find all frequencies of the form $\omega + (K-n)\omega_1$ to be present where $K$ is a positive or negative integer. This is shown diagrammatically in FIG. 3 where the frequencies present for the $n = 1$ side band are represented; similar separate frequencies exist for the other value of $n = 0$, $-1$, $+2$, etc. In the present illustration, the parameters of the system are selected such that the region represented by $\Delta H$ is slowly swept through to produce this side band resonance.

Thus the total signal induced in the receiver coil includes a leakage signal directly from the transmitter coil 13 at the transmitter frequency $\omega$, and a nuclear resonance signal from the nuclear magnetic moments with a frequency component $\omega$ as well as components at all frequencies which differ from $\omega$ by an amount $\omega_1$, $2\omega_1$, $3\omega_1$, . . . These leakage and resonance signals are amplified by a radio-frequency amplifier 18 and fed to a radio-frequency mixer circuit 19 which obtains a reference signal at the frequency $\omega$ directly from the R.F. transmitter 15. In accordance with well-known operation of mixer circuits, the superimposition of a signal wave and a reference wave of different frequencies results in an output wave which pulsates in amplitude at the difference frequency of the component waves. In the present instance one of the signal components from the R.F. amplifier 18, that is, the leakage signal, is of the exact same frequency as the reference signal from the radio-frequency transmitter 15 and thus the output component from the mixer corresponding to these two waves is a D.C. signal. In addition, the component of the nuclear resonance signal obtained from the R.F. amplifier 18 which is of the same frequency $\omega$ as the R.F. transmitter frequency reference signal also results in a D.C. signal output from the mixer. However, the output of the mixer 19 contains signal components with frequencies $\omega_1$, $2\omega_1$, $3\omega_1$, . . . due to the side band nuclear resonance signals resulting from the audio modulation applied to the magnetic field $H_o$. The output of the R.F. mixer 19 is coupled to a band-pass filter 21 which is designed to pass only frequencies near $\omega_1$ and to reject all D.C. signals and signals near $2\omega_1$, $3\omega_1$, etc. It is noted that all of the leakage signals occurring between the transmitter coil 13 and receiver coil 14 has been converted to a D.C. signal in the mixer 19, filtered by the band-pass filter 21, and thus effectively removed from the system at this point. In this case the audio signal is given by $$u + iv = \frac{in_1 T_2 M_0 J_1(\beta) J_o(\beta)[\cos \omega_1 t - i \sin \omega_1 t]}{1 + i(\Delta\omega + \omega_1) T_2}$$

Thus the audio component contains both $u$ and $v$ modes which may be selected independently by proper choice of the audio reference voltage.

The $\omega_1$ output of the band-pass filter 21 is fed to an audio amplifier 22 for amplification and then to an audio mixer circuit 23 which obtains its reference frequency $\omega_1$ directly from the audio oscillator 16 utilized to modulate the magnetic field $H_o$. The output of this mixer 23 contains a D.C. leakage free signal which is suitable for observation on an oscilloscope 24 or for recording on a graphic recorder or the like. The unidirectional magnetic field $H_o$ may be slowly swept through resonance as in a manner utilized in previous nuclear resonance spectrometers, for example, a sweep time of one second to ten minutes, by a well-known saw-tooth sweep generator 25 and sweep coil 26, the output of the sweep generator being coupled to the horizontal sweeping plates of the oscilloscope 24.

Although in the above system the leakage signal was eliminated from the system by a band-pass filter 21 placed after the first mixer 19, it should be understood that one could equally well eliminate the leakage signal by a low pass filter placed after the second mixer 23.

Although the component $\omega_1$ has been selected in the above example as the resonance signal component to be observed, it is obvious that, if desired, other components of the resonance signal can be selected by incorporating a suitable multipler stage in the circuit between the audio oscillator 16 and the audio mixer 23.

It should also be mentioned that the mode selection of the resonance signal, that is, dispersion mode or absorption mode, may be made by means of an audio phase shifter (not shown) placed in the circuit between the audio oscillator 16 and the audio mixer 23 as well as by the known radio-frequency phase shifter circuit (not shown) placed between the R.F. transmitter 15 and the R.F. mixer 19.

Figure 4:
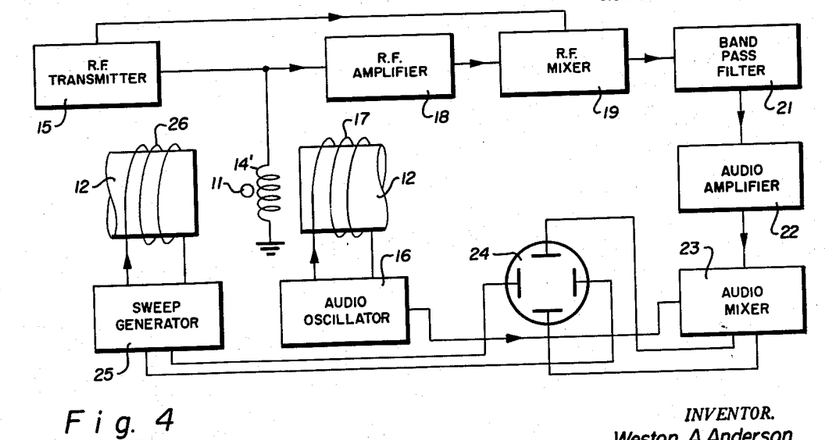
FIG. 4 is a system similar to that shown in FIG. 1 also utilizing audio modulation of the magnetic field, this system being a single coil rather than a cross-coil system.

The invention described above with reference to a crossed coils system is equally applicable to single coil systems such as the known balanced bridge or oscillating detector systems. A single coil, type system depicting a single coil 14' is shown in FIG. 4 for illustration purposes. It can be seen that the units in this system are the same as for the system of FIG. 1 and like reference numerals are used.

By omitting the sweep generator 25 and the oscilloscope 24 from the system of FIG. 1 and connecting the output of the audio mixer to the sweep coils 26 on the magnet 12, this system may serve as a magnetic field control. Any tendency for the magnetic field to shift will result in an error signal output from the audio mixer of a value to correct for the field shift.

There are other embodiments of this side band resonance invention which may be used in place of the above described magnetic field modulated systems. In one such system, the transmitter signal is frequency modulated while the receiver section of the system utilizes amplitude modulation detection (FM-AM system). In another such system, the transmitter signal is amplitude modulated while the receiver section of the system utilizes frequency modulation detection of the resonance signal (AM-FM system).

To obtain the results for AM-FM and FM-AM systems one may consider separately the R.F. fields seen by the nuclei. For each different Fourier component we may assume that the usual slow passage solution of the phenomenological equations is valid and then add the individual solutions below. This method is perfectly valid so long as the separate side band spacings are large compared to the natural line widths.

Figure 5:
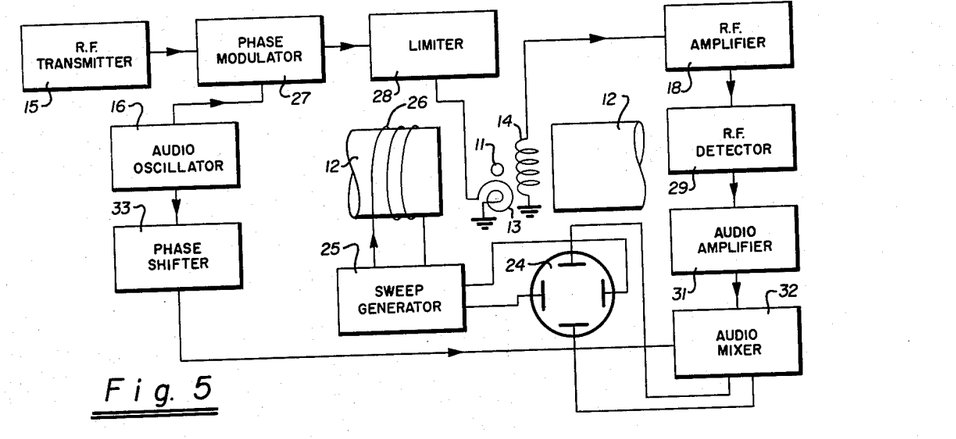
FIG. 5 is a block diagram of a side band type gyromagnetic resonance system in which the transmitter section is frequency modulated to produce a side band resonance and the receiver section is sensitive to amplitude modulation for detecting a resonance condition in the side band.

In FIG. 5 there is shown a block diagram of a gyromagnetic resonance system incorporating the present invention in which the radio-frequency driving signal $\omega$ is frequency modulated at the audio rate. In this instance the invention is shown embodied in a crossed coils nuclear magnetic resonance system similar to FIG. 1, although this frequency modulation scheme is equally applicable to single coil systems. The radio-frequency transmitter 15 generates a signal of frequency $\omega$ which is transmitted to a phase modulator circuit 27 which is also coupled to the audio oscillator 16 from which it receives a modulating signal of frequency $\omega_1$, the R.F. oscillator signal thus being frequency modulated at the audio-frequency rate to give an output signal with components including $\omega$, $\omega+\omega_1$, and $\omega-\omega_1$. These signals pass into an R.F. limiter circuit 28 which serves to limit any undesired amplitude variations occurring in the transmitter 15 or modulator 27 since the receiver end of this system is sensitive to amplitude variations. Provided the transmitter 15 is stable so that amplitude fluctuations do not occur and the modulator does not introduce any AM components, the limiter 28 may be omitted. The audio-frequency should be large compared to the line spacings in a spectra and small compared to the band-pass of the R.F. amplifier and limiter in this system. For example, an audio-frequency of two kilocycles may be selected as illustrative.

By phase modulating the transmitter signal the R.F. field of the transmitter coil will have the form $h_1 \exp(i\omega t + i\beta \sin \omega_1 t)$ $$= h_1 \exp(i\omega t) \sum_{n=-\infty}^{\infty} J_n(\beta) \exp(in\omega_1 t)$$

where $\beta$ is the maximum change of phase angle produced by the modulator 27.

This system does not have the same restraint on the audio-frequency value as does the systems of FIGS. 1 and 4 wherein the magnetic field $H_0$ is audio modulated. As the audio-frequency $\omega_1$ used in the system of FIG. 1 and 4 increases, higher $H_m$ power is necessary since $$\beta = \frac{H_m}{w_1}$$

and this power demand limits the audio frequency to lower values than can be readily utilized in this frequency modulation system.

The values of the frequencies $\omega$ and $\omega_1$ and the strength of the field $H_0$ are so chosen that the nuclear resonance is made to occur in the sample at one of the sidebands, for example $n=1$.

In this case the magnetic field $H_0$ must be equal to $$\frac{\omega + \omega_1}{\gamma}$$

to produce resonance. The resonance signal in thic case has only the frequency $\omega+\omega_1$. The R.F. field at this frequency has an amplitude of $h_1 J_1(\beta)$ and so the saturation parameter will be $s = \gamma^2 H_1^2 J_1^2(\beta) T_1 T_2$. The input to the R.F. amplifier 18 thus comprises the output signal directly from the transmitter coil 14 including the frequency components $\omega$, $\omega+\omega_1$, and $\omega-\omega_1$ and, at resonance, the signal $\omega+\omega_1$. The output of the R.F. amplifier 18 is fed to an R.F. detector 29. During the time no resonance signals are stimulated, there will be no output from the R.F. detector 29 since the detector is only sensitive to the amplitude changes of the R.F. voltage. However, in the presence of a resonance signal, an audio output at frequency $\omega_1$ will occur at the output of the R.F. detector 29 since the incoming wave will now have some amplitude modulation. The audio signal is amplified in audio amplifier 31 and is converted into a D.C. signal in the audio mixer 32. Either the $u$ or $v$ mode component may be selected by the choice of the phase, by means of phase shifter 33, of the audio reference voltage from the audio oscillator 16.

Figure 6:
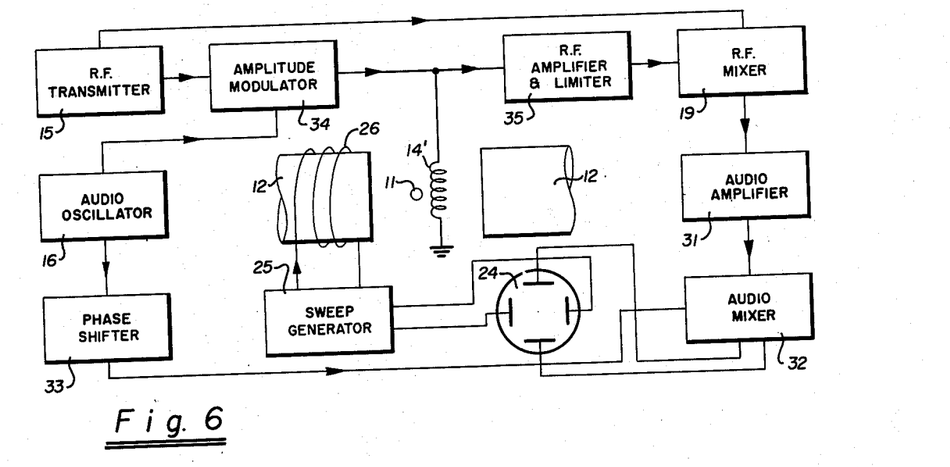
FIG. 6 is a block diagram of a side band resonance system in which the transmitter section of the system is amplitude modulated to produce the side band resonance condition while the receiver section is sensitive to frequency modulation for detecting such resonance.

Referring to FIG. 6 there is shown in block diagram a system incorporating this invention in which the transmitter signals are amplitude modulated, as distinguished from the frequency modulation utilized in the system of FIG. 5, and the receiver circuitry of the system is made sensitive to frequency modulated signals, as distinguished from the amplitude modulation sensitivity of the receiver circuitry in the system of FIG. 5. This system may be referred to as the AM-FM system and, although embodied in a single coil system, as before, it can be utilized as well in a crossed-coils system.

The radio-frequency signal $\omega$ from the R.F. transmitter 15 is applied to an amplitude modulator 34 which receives an audio modulating signal at frequency $\omega_1$ from the audio oscillator 16. The signal output from the amplitude modulator to the R.F. coil contains $\omega, \omega+\omega_1$, and $\omega-\omega_1$. The system parameters are selected such that resonance occurs in the sample at one of the sideband frequencies, for example, $\omega+\omega_1$. The signal into the probe is $(1-M \sin \omega_1 t) \sin \omega t$ where $M$=index of modulation.

The signal into the R.F. amplifier and limiter 35 during upper side band resonance is then given by $$\sin \omega t + (1+Ev)\frac{M}{2} \cos(\omega+\omega_1)t + Eu\frac{M}{2} \sin(\omega+\omega_1)t$$

$$= \frac{M}{2} \cos(\omega-\omega_1)t = \alpha(t) \sin[\omega t + \theta(t)]$$

where $$\alpha^2 = [1 + M\left(1 - \frac{Ev}{2}\right) \sin \omega_1 t + \frac{M}{2} Eu \cos \omega_1 t]^2$$

$$+ \left[\frac{M}{2}(Ev \cos \omega_1 t + Eu \sin \omega_1 t)\right]^2$$

and $$\tan \theta = \frac{\frac{M}{2}(Ev \cos \omega_1 t + Eu \sin \omega_1 t)}{1 + M \sin \omega_1 t - \frac{M}{2}(Ev \sin \omega_1 t - Eu \cos \omega_1 t)}$$

and $Eu$ is the $u$ signal and $Ev$ is the $v$ signal.

Under normal condition $Eu$, $Ev \ll 1$ thus $\theta \ll 1$, we expand $$\theta = \frac{M}{2} \frac{(Ev \cos \omega_1 t + Eu \sin \omega_1 t)}{1 + M \sin \omega_1 t}$$

In passing the R.F. signal through the limiter we fix $\alpha$ and leave $\theta$ unchanged.

We now Fourier analyze $\theta$. For $M \ll 1$ this is simply $$\theta = \frac{M}{2} Eu \sin \omega_1 t + \frac{M}{2} Ev \cos \omega_1 t$$

Thus with an audio phase detector one may select either the $u$ or $v$ mode signal.

Expressed in another way, if there is no resonance taking place in the sample, the output of the radio frequency amplifier and limiter 35 contains only $\omega$ because the limiter removes all amplitude modulation from the $\omega$ signal. If resonance is occurring, however, the signal into the limiter contains both amplitude and frequency modulation of the carrier $\omega$. The limiter removes the amplitude modulation and passes the frequency modulation and, thus, the output of the limiter is a frequency modulated carrier whose phase varies in accordance with the resonance signal. The output from the R.F. amplifier and limiter 35 is passed to an R.F. mixer 19 or phase detector which receives its reference signal from the radio-frequency transmitter 15. The output of the mixer 19 is an audio signal at frequency $\omega_1$ which varies in amplitude with resonance. This output is transmitted through an audio amplifier 31 to an audio mixer circuit 32 where either the $u$ or $v$ mode component may be selected by the choice of the phase, by means of the phase shifter 33, of the audio reference voltage from the audio oscillator 16. The D.C. output signal of this system is then transmitted to the oscilloscope 24 which receives its slow horizontal sweep signal from the sweep generator 25.

Figure 7:
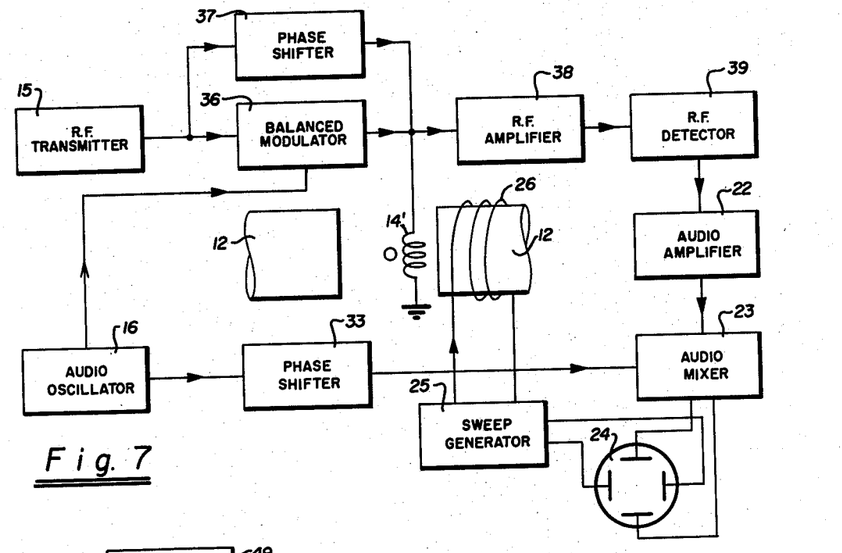
FIG. 7 is a block diagram of a balanced modulator type system utilizing the side band resonance condition of the present invention.

Referring now to FIG. 7 there is shown another embodiment of the present invention in which the modulation technique is utilized in a high resolution nuclear magnetic resonance spectrometer to reduce or eliminate the base line drift of the signal. The radio-frequency transmitter 15 produces a signal $\omega$ which is applied to a balanced modulator circuit 36 which receives an audio signal $\omega_1$ from the audio oscillator 16. If we let the signal from the R.F. transmitter be $\cos \omega t$ and the signal from the audio oscillator be $\sin \omega_1 t$, the signal output from the balanced modulator will then be $M \cos \omega t \sin \omega_1 t$. In other words, the output of the balanced modulator contains only the frequency components $\omega + \omega_1$ and $\omega - \omega_1$ and suppresses the $\omega$ signal. Coupled into the output of the balanced modulator 36 is a signal directly from the R.F. transmitter 15 which is passed through a phase shifter 37 for selecting the phase and we will assume that the phase is shifted by $\phi$ from the R.F. transmitter frequency. With the parameters set so that resonance is stimulated in the sample at the upper side band $\omega + \omega_1$, the voltages into the radio-frequency amplifier 38 and detectors 39 will be proportional to $$\cos (\omega t + \phi) + M \cos \omega t \sin \omega_1 t$$

$$+ \frac{Mv}{2} \sin (\omega + \omega_1) t + \frac{Mu}{2} \cos (\omega + \omega_1) t$$

where $u$ and $v$ are the resonance signals. These frequencies all mix in the detector 39 and the D.C. terms and those at audio frequencies appear at the output of the detector, the others being filtered out. The detector output will thus have the following $$\frac{M}{2} \cos \phi \sin \omega_1 t - \frac{Mv}{4} \sin (\phi - \omega_1 t) + \frac{Mu}{4} \cos (\phi - \omega_1 t)$$

$$+ \frac{M^2 v}{4} \sin^2 \omega_1 t + \frac{M^2 u}{4} \sin \omega_1 t \cos \omega_1 t$$

From the above relationship we see that all audio components except the resonance signals disappear if $\theta$ is made equal to 90°. The output is then $$-\frac{Mv}{4} \cos \omega_1 t + \frac{Mu}{4} \sin \omega_1 t + \frac{M^2 v}{4}\left(\frac{1}{2} - \frac{1}{2} \cos 2\omega_1 t\right)$$

$$+ \frac{M^2 u}{4} \sin 2\omega_1 t$$

The $u$ or $v$ mode may be selected in the audio mixer 23 by a signal of the proper phase from the audio oscillator 16. The reference signal from the R.F. transmitter 15 and phase shifter 37 could equally well be fed into a phase detector or mixer circuit in the place of the R.F. detector circuit 39. This system may be used in either a single coil or crossed-coils type of gyromagnetic resonance system.

It is noted that all of these systems have the advantage that most of the gain in the systems may be obtained at audio frequencies rather than radio frequencies. Another great advantage of these systems is that the audio signal at frequency $\omega_1$ from the detector in the receiver section is independent of coupling between the transmitter and receiver sections. This will greatly limit or eliminate the "base line drift" due to changes in oscillator level, probe balance, and radio frequency or audio gain.

Figure 8:
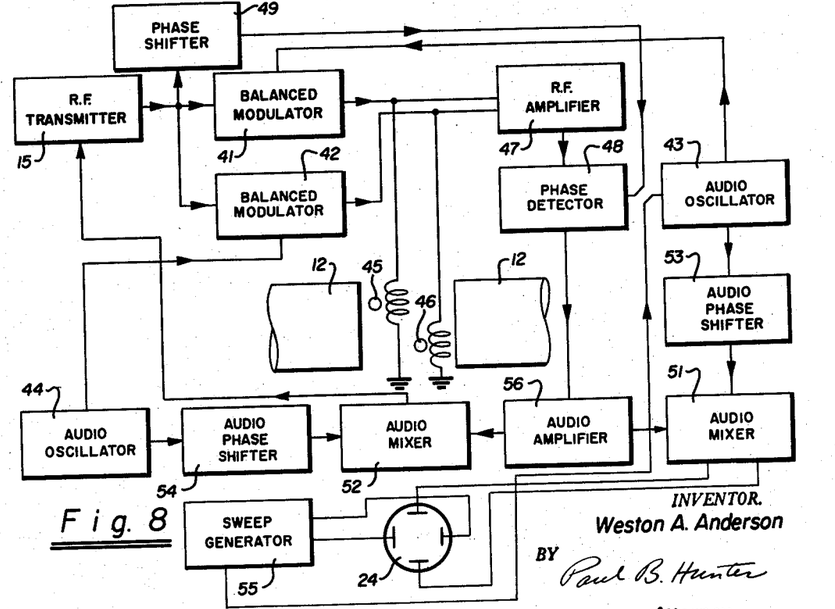
FIG. 8 is a two-channel or multiplex system utilizing side band resonances for permitting a single receiver section to be utilized for detection of two or more resonance signals.

There is shown in FIG. 8 a two-channel or multiplex nuclear magnetic resonance spectrometer in which a pair of resonance signals are transmitted through the same radio-frequency receiver, this system utilizing the side band resonance feature of the present invention. Since the radio frequency amplifiers used in the receiver systems of nuclear magnetic resonance spectrometers have a large bandwidth compared to the resonance signal bandwith, two or more resonance signals can be amplified in a single radio-frequency amplifier simultaneously. In such a two-channel system, one channel may be used for producing a nuclear control signal to be used in radio-frequency or magnetic field stabilization while a second channel may be used for the chemical analysis of a sample. In the two-channel, side band resonance type system shown in FIG. 8, the radio frequency transmitter 15 supplies a frequency signal $\omega$ to each of two balanced modulator circuits 41 and 42 which receive their reference signals from the associated audio oscillators 43 and 44, respectively. The signal output of audio oscillator 43 is $\omega_1$ while the signal output of the second audio oscillator 44 is $\omega_2$. Thus the output of the first balanced modulator 41 has the frequency components $\omega + \omega_1$ and $\omega - \omega_1$ while the output of the second balanced modulator 42 contains the frequency components $\omega + \omega_2$ and $\omega - \omega_2$. The parameters of the system are so chosen that resonance occurs in the first sample 45 at the upper side band $\omega + \omega_1$ while the parameters of the second sample 46 are arranged such that resonance occurs in the upper side band $\omega + \omega_2$. It is noted that these parameters may be met by placing different type samples in the same magnetic field strength $H_0$ or by using the same type sample but placing it at different points in the strong unidirectional magnetic field such that the resonances occur at the desired different frequency values. For best results it is desirable that the Larmor frequencies of the two resonances be spaced apart a greater distance than the signal bandwidth.

The input into the radio-frequency amplifier 47 and phase detector 48 consists of the signal components directly from the balanced modulators 41 and 42 of frequency $\omega+\omega_1$, $\omega-\omega_1$, $\omega+\omega_2$, and $\omega-\omega_2$, along with the resonant signal components from the radio-frequency coils consisting of $\omega+\omega_1$, $\omega+\omega_2$. The phase detector 48 receives its reference signal from the radio-frequency transmitter 15 through a phase shifter 49. With a 90° phase shift of the reference signal there is no output signal from the phase detector 48 unless resonance is occurring in the samples and at such time there is an output $\omega_1$ and/or $\omega_2$ depending on the resonance condition. This output signal is sent through an audio amplifier 56 to a pair of audio mixers 51 and 52, one 51 of which receives its reference signal $\omega_1$ from the audio oscillator 43 by way of an audio phase shifter 53. The other mixer 52 receives its reference signal from the audio oscillator 44 through an audio phase shifter 54. The outputs from the audio mixers 51 and 52 are D.C. signals which are directly related to the resonance condition in the respective samples. The output of one of the audio mixers, for example, 52 may be coupled through a variable reactance circuit in the radio-frequency transmitter to control the transmitter and maintain its frequency stabilized during operation. A sweep generator 55 is coupled to the audio oscillator 43 for producing a frequency sweep through resonance, the sweep generator also being coupled to the horizontal sweeping plates on the oscilloscope to which the output of the second audio mixer is also connected. By means of the audio phase shifters 53 and 54 the $u$ or $v$ modes of the resonance signals may be readily selected.

Figure 9:
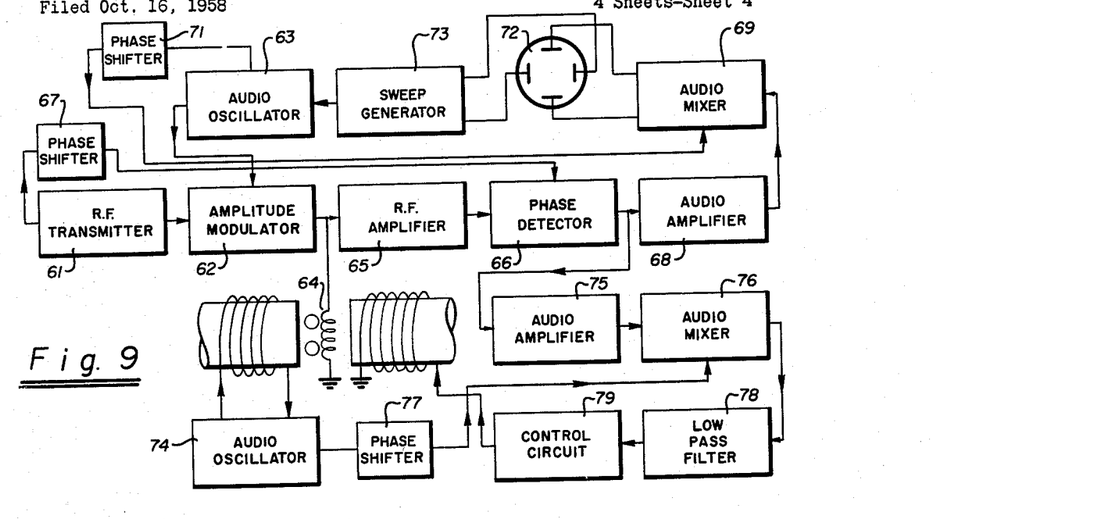
FIG. 9 is a block diagram of a multiplex or double side band resonance system utilizing the present invention, one side band resonance being utilized for chemical analysis and the other side band resonance for stabilization of the system parameters.

There is shown in FIG. 9 a block diagram of another double side band resonance system which utilizes the present invention, one side band resonance being used for chemical analysis of the sample under investigation and the other side band resonance being obtained from an another sample and utilized for a reference signal for use in stabilizing the parameters of this system, in this case stabilizing the unidirectional magnetic field produced by the magnets. The side band resonance circuitry utilized for observing a resonance signal from the sample under analysis is similar to the system shown in FIG. 6.

A radio-frequency transmitter 61 generates a signal of frequency $\omega$ which is transmitted to an amplitude modulator circuit 62 which also receives an audio modulating signal at frequency $\omega_1$ from the audio oscillator 63. The signal output from the amplitude modulator 62 to the radio-frequency coil 64 contains $\omega$, $\omega+\omega_1$, $\omega-\omega_1$. The system parameters are selected such that resonance occurs in the sample under analysis at one of the side band frequencies, for example, $\omega+\omega_1$, as explained above with reference to FIG. 6. The output from the radio-frequency amplifier 65 and the radio-frequency mixer or phase detector 66, which receives its reference signal from the radio-frequency transmitter 61 through the phase shifter 67, is an audio signal at frequency $\omega_1$ which varies in amplitude with resonance. This output is transmitted through an audio amplifier circuit 68 to an audio mixer 69 which receives its reference voltage through a phase shifter 71 from the audio oscillator 63 utilized to modulate the transmitter signal at audio frequency $\omega_1$. The D.C. output signal from the audio mixer 69 is transmitted to the vertical sweep plates of an oscilloscope 72, the horizontal sweep signal being received from the sweep generator 73 which is utilized to modulate the audio oscillator 63 to thereby sweep through resonance.

In the present system shown the second set of side band frequencies are produced by an audio-frequency modulation of the polarizing magnetic field at an audio-frequency $\omega_2$ from an audio oscillator 74. As explained above with regard to FIG. 1, this modulation of the magnetic field results in side band signals with frequencies $\omega$, $\omega\pm\omega_2$, $\omega+2\omega_2$, etc. The parameters of the system are selected to produce resonance at one of the side bands, for example $\omega+\omega_2$, as described above with regard to FIG. 1. This side band resonance due to the magnetic field modulation is transmitted through the radio-frequency amplifier 65 and the radio-frequency phase detector 66, this resonance signal occurring as an audio-frequency $\omega_2$ at the output of the phase detector unit. This audio frequency signal is transmitted through an audio amplifier 75 to an audio mixer 76 which receives its reference signal directly from the audio oscillator 74, the output of the audio oscillator being transmitted through a phase shifter circuit 77 so that the $u$ mode signal may be selected in the audio mixer 76. This $u$ mode signal is passed through a low pass filter 78 and used to regulate a magnet control circuit 79 for stabilizing the polarizing magnetic field. The output of the low pass filter may be utilized to control magnetic field stabilizers now in common use or, in the case of electromagnets, it may be utilized to control the flow of current through the electromagnet. The output of the control circuit may also be utilized to control the frequency of the radio-frequency transmitter 61, through a variable reactance circuit, rather than the strength of the magnetic field if desired.

Practically any sample with a relatively strong line may be used as a reference. The reference line should be well removed from any of the resonance lines in the sample under analysis, for example by 10 c.p.s. or so, since it is not desired to sweep the sample under analysis in the neighborhood of the reference line. A good reference compound when analysing proton samples is hexamethyl desiloxane since it has a strong line which lies outside of the normal range of proton chemical shifts.

The system shown in FIG. 9 utilizes magnetic field modulation to produce side band resonance in the channel utilized to stabilize this system and, in the channel used for chemical analysis, it utilizes amplitude modulation of the transmitter signal and phase sensitive detection in the receiver. These two basic types of side band resonance systems are shown in FIGS. 1 and 6. It will be apparent to those skilled in the art that a multiplex system of the general type shown in FIG. 9 may equally well incorporate the FM-AM type of system shown in FIG. 7 as well as other combinations of these three modulation arrangements. For example, the stabilizing or reference channel may employ magnetic field modulation as shown in FIG. 9 while the chemical analysis channel utilizes either magnetic field modulation, or AM-FM modulation, or FM-AM modulation. Likewise, the reference channel may employ either AM-FM modulation or FM-AM modulation while the analysis channel employs magnetic field, or AM-FM, or FM-AM modulation. All of these basic modulation schemes are shown and described in the earlier figures.

Figure 10:
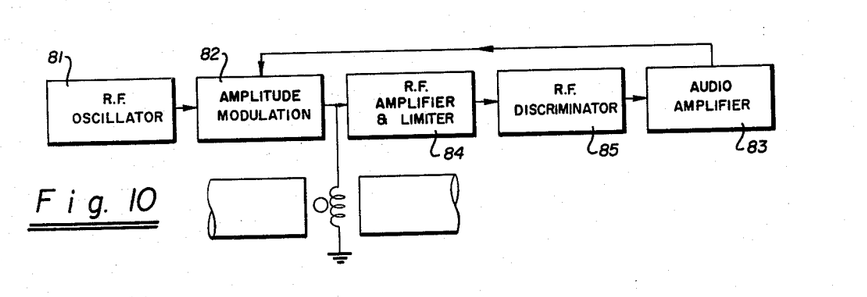
FIGS. 10 and 11 are block diagrams of side band resonance oscillators utilizing sideband modulation techniques.
Figure 11:
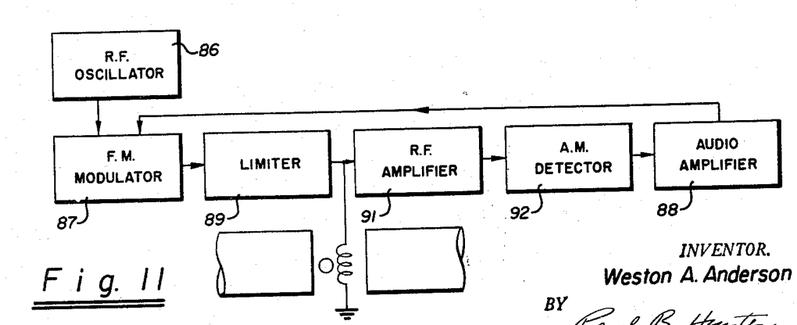

FIGS. 10 and 11 show two different embodiments of a gyromagnetic resonance oscillator system, these systems being more fully described and also claimed in a copending divisional patent application of the present inventor.

FIG. 10 discloses an oscillator in which the front end or transmission end utilizes amplitude modulation while the rear end or receiver end is made sensitive to frequency modulated signals. The reverse is shown in the oscillator system of FIG. 11 where the front end is a frequency modulation system and the receiver end is made sensitive to amplitude modulation.

In FIG. 10 a radio-frequency oscillator 81 supplies a signal to the amplitude modulator 82 where the amplitude of the signal is modulated in accordance with a feedback signal from the audio amplifier 83 to produce side band frequencies. The parameters of the system are selected such that resonance occurs in the sample at one of the side band resonances. The resonance signal is transmitted through the radio-frequency amplifier and limiter 84 to the radio-frequency discriminator 85, the output of which is coupled through the audio amplifier 83 back to the amplitude modulator 82 to thereby provide a closed loop feedback circuit for sustaining oscillations at the side band resonance frequency. As in the other systems of the AM-FM type, this system gives both radio-frequency and audio-frequency gain with the advantage of not requiring large amplification at high frequencies. In addition, this system is not sensitive to changes in radio-frequency gain.

In the system shown in FIG. 11, the radio-frequency oscillator 86 supplies a signal to the frequency modulator 87 which receives its reference signal in a feedback circuit from the audio amplifier 88. The output of the modulator 87 is coupled through a limiter 89 to the sample in the magnetic field, the parameters of the radio-frequency and magnetic field being chosen so that resonance occurs in the sample at one of the side band frequencies. The resonance signal is transmitted through the radio frequency amplifier 91 to the amplitude modulation detector 92, the output of which is coupled to the audio amplifier 88 and through the feedback circuit to the frequency modulator 87.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic resonance system for producing gyromagnetic resonance in a sample located in a polarizing magnetic field wherein drift of the output signal is eliminated which comprises radio-frequency transmitter means including a phase modulator circuit for supplying a radio-frequency driving signal to the sample substantially normal to the direction of the polarizing magnetic field to produce gyromagnetic resonance therein, a low frequency oscillator means coupled to said phase modulator for modulating the phase of the radio-frequency signal at the low-frequency rate adapted to produce a center band radio-frequency resonance signal and a plurality of side band radio-frequency resonance signals from the sample within said fields, each resonance signal having a line width in the resonance spectrum which is separated from the others in the resonance spectrum, each resonance signal including signal frequency components at the driving or center band frequency and at each side band frequency, means for sweeping through the line width of one of said side band resonance signals, receiver means including a radio-frequency detector for receiving the resonance signal at said side band frequency and leakage signals at the center and side band frequencies, said detector being sensitive to amplitude changes of the received radio-frequency signals and thereby rejecting all radio-frequency components and all modulating frequency components but a desired one of the modulating frequency components of said one side band radio frequency resonance signal, and a low frequency mixer coupled to the output of said radio-frequency detector and coupled to said low frequency oscillator means whereby a D.C. output signal varying in accordance with the amplitude of said modulation frequency component of the side band resonance signal is obtained.

2. A gyromagnetic resonance system as claimed in claim 1 including a phase shifter coupled between the low frequency oscillator means and said low frequency mixer for selecting the $u$ or $v$ mode of said side band resonance signal.

3. A gyromagnetic resonance system for producing gyromagnetic resonance in a sample located in a polarizing magnetic field wherein drift of the output signal is eliminated which comprises radio-frequency transmitter means including an amplitude modulator circuit for supplying a radio-frequency driving signal to the sample substantially normal to the direction of the polarizing magnetic field to produce gyromagnetic resonance therein, a low frequency oscillator means coupled to said amplitude modulator for modulating the amplitude of the radio-frequency signal at the low frequency rate adapted to produce a center band radio frequency resonance signal and a plurality of side band radio-frequency resonance signals from the sample within said fields, each resonance signal having a line width in the resonance spectrum which is separated from the others in the resonance spectrum, each resonance signal including signal frequency components at the driving or center band frequency and at each side band frequency, means for sweeping the line width of one of said side band resonance signals, receiver means including a limiter means for rejecting amplitude modulated signals and accepting frequency modulated signals and a radio-frequency mixer coupled to the output of said limiter for receiving the side band resonance signal and leakage signals at the center and side band frequencies and for also receiving a reference signal at the center frequency to give an output signal at the low frequency modulation rate of the side band resonance signal, and a low frequency discriminator means coupled to the output of said radio-frequency mixer and coupled to said low frequency oscillator means whereby a D.C. output signal varying in accordance with the frequency modulation of the resonance signal is obtained.

4. A gyromagnetic resonance system as claimed in claim 3 including a phase shifter circuit coupled between the low frequency oscillator and the low frequency discriminator for selecting the $u$ or $v$ mode of the side band resonance frequency signal.

5. A gyromagnetic resonance system for producing gyromagnetic resonance in a sample located in a polarizing magnetic field which comprises radio-frequency transmitter means including a balanced modulator for supplying radio-frequency driving signals to the sample substantially normal to the direction of the polarizing magnetic field to produce gyromagnetic resonance therein, a low frequency oscillator means coupled to said balanced modulator for modulating the radio frequency transmitter signal, the radio frequency output of the balanced modulator being side band frequencies of the fundamental transmitter frequency, and means for also introducing into the output of said balanced modulator a radio-frequency signal of said transmitter frequency with controllable phase relative to said side band driving signals, said fundamental and side band frequencies adapted to produce a center band radio frequency resonance signal and a plurality of side band radio frequency resonance signals from the sample within said fields, each resonance signal having a line width in the resonance spectrum which is separateed from the others in the resonance spectrum, each resonance signal including signal frequency components at the fundamental or center band frequency and at each side band frequency, means for changing one of said magnetic fields to thereby sweep through the line width of only one of said side band resonance signals, a receiver means coupled to said sample which receives the side band frequency signals, the phase shifted fundamental frequency signal side band resonance frequency signal from the sample, said receiver means including a radio-frequency detector which filters out all signals except those at D.C. and low frequencies, a low frequency mixer coupled to the output of said radio-frequency detector and receiving a reference signal from said low frequency oscillator means, whereby the output of said low frequency mixer is a signal proportional to the one side band resonance signal in said sample, and means for indicating said last signal output.

6. A gyromagnetic resonance system as claimed in claim 5 including phase shifter means coupled between the low frequency oscillator means and said low frequency mixer means for selecting the $u$ or $v$ mode of the resonance signal.

7. A method eliminating drift of the output signal of a gyromagnetic resonance spectrometer employing the production and detection of gyromagnetic resonance in a gyromagnetic sample located in a polarizing magnetic field comprising the steps of applying a driving radio frequency magnetic field to the sample substantially normal to the direction of the polarizing field to produce gyromagnetic resonance therein, said drift being due, for example, to changes in the radio frequency transmitter level or in probe balance, modulating said driving radio frequency field at a low frequency rate adapted to produce a center band radio frequency resonance signal and a plurality of side-band radio frequency resonance signals from the sample within said fields, each resonance signal having a line width in the resonance spectrum which is separated from the others in the resonance spectrum, each resonance signal including signal frequency components at the driving or center band frequency and at each side band frequency, sweeping through the line width of one of said side band resonance signals, rejecting all radio frequency components and all modulating frequency components but a desired one of the modulating frequency components of said one radio frequency side band resonance signal, mixing said one desired modulating frequency component with a frequency component derived from said modulation frequency to obtain a signal output proportional to the amplitude of said modulation frequency component of said side band resonance signal, and indicating said last signal output.

8. The method as claimed in claim 7 wherein the step of modulating the driving radio frequency signal comprises modulating the frequency of the transmitter frequency and the step of detecting the modulating frequency component of the amplified radio frequency resonance signal comprises the step of detecting the amplitude variations of the radio frequency output which includes the resonance signal.

9. The method as claimed in claim 7 wherein the step of modulating the driving radio frequency signal comprises modulating the amplitude of the transmitter frequency and the step of detecting the modulating frequency component of the amplified radio frequency resonance signal comprises the step of detecting the frequency variations of the radio frequency output which includes the resonance signal.

10. A gyromagnetic resonance spectrometer for producing gyromagnetic resonance in a gyromagnetic sample located in a polarizing magnetic field wherein drift of the output signal is eliminated which comprises means including a radio frequency transmitter for supplying a driving radio frequency magnetic field to the sample substantially normal to the direction of the polarizing magnetic field to produce gyromagnetic resonance therein, means for modulating said driving radio frequency signal at a low frequency rate adapted to produce a center band radio frequency resonance signal and a plurality of side-band radio frequency resonance signals from the sample within said fields, each resonance signal having a line width in the resonance spectrum which is separated from the others in the resonance spectrum, each resonance signal including signal frequency components at the driving or center band frequency and at each side band frequency, means for sweeping through the line width of one of said side-band resonance signals, receiver means including means for detecting the modulating frequency component of said radio frequency resonance signal and rejecting all radio frequency components and all frequency components at the modulation frequency which are not produced by the resonance in the sample, a low frequency mixer coupled to the output of said receiver, means for detecting said modulation frequency signal so as to obtain a signal output proportional to the amplitude of said modulation frequency signal, and means for indicating said last signal output.

11. A gyromagnetic resonance spectrometer for producing gyromagnetic resonance in a gyromagnetic sample located in a polarizing magnetic field wherein drift of the output signal is eliminated which comprises means including a radio frequency transmitter for supplying a driving radio frequency magnetic field to the sample substantially normal to the direction of the polarizing magnetic field to produce gyromagnetic resonance therein, means including a phase modulator for modulating the phase of said driving radio frequency signal at a low frequency rate adapted to produce a center band radio frequency resonance signal and a plurality of side-band radio frequency resonance signals from the sample within said fields, each resonance signal having a line width in the resonance spectrum which is separated from the others in the resonance spectrum, each resonance signal including signal frequency components at the driving or center band frequency and at each side band frequency, means for sweeping through one of said side-band resonance signals, receiver means including means for detecting the modulating frequency component of said side band radio frequency resonance signal and rejecting all radio frequencies and all frequencies at the modulation frequency which are not produced by the resonance in the sample, a low frequency mixer coupled to the output of said receiver, means for detecting said modulation frequency signal so as to obtain a signal output proportional to the amplitude of said modulation frequency signal, and means for indicating said last signal output.

12. A gyromagnetic resonance spectrometer for producing gyromagnetic resonance in a gyromagnetic sample located in a polarizing magnetic field wherein drift of the output signal is eliminated which comprises means including a radio frequency transmitter for supplying a driving radio frequency magnetic field to the sample substantially normal to the direction of the polarizing magnetic field to produce gyromagnetic resonance therein, means including an amplitude modulator for modulating the amplitude of said driving radio frequency signal at a low frequency rate adapted to produce a center band radio frequency resonance signal, and a plurality of side-band radio frequency resonance signals from the sample within said fields, each resonance signal having a line width in the resonance spectrum which is separated from the others in the resonance spectrum, each resonance signal including signal frequency components at the driving or center band frequency and at each side band frequency, means for sweeping through the line width of one of said side-band resonance signal, receiver means including means for detecting the modulating frequency component of said radio frequency resonance signal and rejecting all radio frequencies and all frequencies at the modulation frequency which are not produced by the resonance in the sample, a low frequency mixer coupled to the output of said receiver means for detecting said modulation frequency signal so as to obtain a signal output proportional to the amplitude of said modulation frequency signal, and means for indicating said last signal output.

13. The method of eliminating drift of the output signal from a gyromagnetic sample located in a polarizing magnetic field of a gyromagnetic resonance spectrometer system comprising the steps of applying a driving radio frequency magnetic field to the sample substantially normal to the direction of the polarizing magnetic field to produce gyromagnetic resonance therein, modulating one of said magnetic fields at a low frequency rate adapted to produce a center band radio frequency resonance signal and a plurality of side band radio frequency resonance signals from the sample within said fields, each resonance signal having a line width in the resonance spectrum which is separated from the others in the resonance spectrum, each resonance signal including signal frequency components at the driving or center band frequency and at each side band frequency, changing one of said magnetic fields to thereby sweep through the line width of only one of said resonance signals, rejecting all radio frequency components and all modulating frequency components but a desired one of the modulating frequency components of said one radio frequency resonance signal, mixing said one desired modulating frequency component with a frequency component derived from said modulation frequency to obtain a signal output proportional to the amplitude of said modulation frequency component of said resonance signal, and indicating said last signal output.

14. The method as claimed in claim 13 wherein the step of modulating one of said magnetic fields at a low frequency rate comprises modulating said polarizing magnetic field.

15. The method of eliminating drift of the output signal from a nuclear sample located in a polarizing magnetic field of a nuclear magnetic resonance spectrometer system comprising the steps of applying a driving radio frequency magnetic field to the sample substantially normal to the direction of the polarizing magnetic field to produce nuclear magnetic resonance therein, modulating one of said magnetic fields at a low frequency rate adapted to produce a center band radio frequency resonance signal and a plurality of side band radio frequency resonance signals from the sample within said fields, each resonance signal having a line width in the resonance spectrum which is separated from the others in the resonance spectrum, each resonance signal including signal frequency components at the driving or center band frequency and at each side band frequency, changing one of said magnetic fields to thereby sweep through the line width of only one of said resonance signals, rejecting all radio frequency components and all modulating frequency components but a desired one of the modulating frequency components of said one radio frequency resonance signal, mixing said one desired modulating frequency component with a frequency component derived from said modulation frequency to obtain a signal output proportional to the amplitude of said modulation frequency component of said resonance signal, and indicating said last signal output.

16. Apparatus for eliminating drift of the output signal from a gyromagnetic sample located in a polarizing magnetic field of a gyromagnetic resonance spectrometer system comprising a radio frequency transmitter means for applying a driving radio frequency magnetic field to the sample substantially normal to the direction of the polarizing magnetic field to produce gyromagnetic resonance therein, means for modulating one of said magnetic fields at a low frequency rate adapted to produce a center band radio frequency resonance signal and a plurality of side band radio frequency resonance signals from the sample within said fields, each resonance signal having a line width in the resonance spectrum which is separated from the others in the resonance spectrum, each resonance signal including signal frequency components at the driving or center band frequency and at each side band frequency, sweep generator means for changing one of said magnetic fields to thereby sweep through the line width of only one of said separate resonance signals, receiver means including means for rejecting all radio frequency components and all modulating frequency components but a desired one of the modulating frequency components of said one radio frequency resonance signal and for mixing said one desired modulating frequency component with a frequency component derived from said modulation frequency to obtain a signal output proportional to the amplitude of said modulation frequency component of said resonance signal, and means for indicating said last signal output.

17. The apparatus as claimed in claim 16 wherein the means for modulating one of said magnetic fields at a low frequency rate comprises means for modulating said polarizing magnetic field.

18. The apparatus as claimed in claim 16 wherein the sweep generator means for changing one of said magnetic fields to sweep through the one line width comprises means for changing said polarizing magnetic field.

References Cited in the file of this patent

Smaller: Physical Review, vol. 83, No. 1, Aug. 1951, pp. 812 to 820 incl.

Williams: Physica XVII, No. 3–4, March-April 1951, pp. 454 to 460.

Burgess: Review of Scientific Instruments, vol. 23, No. 7, July 1952, pp. 334 to 336 incl.

Smaller et al.: The Review of Scientific Instruments, vol. 24, No. 10, Oct. 1953, pp. 991 and 992.

Feher et al.: Physical Review, vol. 98, No. 2, Apr. 15, 1955, pp. 337 to 347.

Shoolery et al.: The Journal of Chemical Physics, vol. 23, No. 5, May 1955, pp. 805 to 811.

Arnold: Physical Review, vol. 102, No. 1, April 1, 1956, pp. 136 to 150.

Anderson: Physical Review, vol. 102, No. 1, April 1956, pp. 151 to 167.

Baker et al.: The Review of Scientific Instruments, vol. 28, No. 5, May 1957, pp. 313 to 321.

Mitchell et al.: The Review of Scientific Instruments, vol. 28, No. 8, August 1957, pp. 624 to 628.

Primas et al.: Helvetica Physica Acta, vol. 30, 1957, pp. 315–330.

UNITED STATES PATENT OFFICE
CERTIFICATE OF CORRECTION

Patent No. 3,147,428 September 1, 1964

Weston A. Anderson

It is hereby certified that error appears in the above numbered patent requiring correction and that the said Letters Patent should read as corrected below.

Column 3, lines 13 and 14, equation (1), for that portion reading "$-iM_z+$" read -- $-ihM_z+$ --; column 4, line 12, for "value" read -- values --; column 6, line 26, for "thic" read -- this --; lines 74 and 75, for "$=\frac{M}{2}\cos$" read -- $+\frac{M}{2}\cos$ --; column 7, line 14, for "condition" read -- conditions --; column 8, line 45, for "bandwith" read -- bandwidth --; column 12, line 46, for "separateed" read -- separated --; line 54, after "signal" insert -- and the --.

Signed and sealed this 6th day of July 1965.

(SEAL)
Attest:

ERNEST W. SWIDER
Attesting Officer

EDWARD J. BRENNER
Commissioner of Patents